P. TRIMMER.
HAY-KNIFE.
No. 174,875. Patented March 14, 1876.
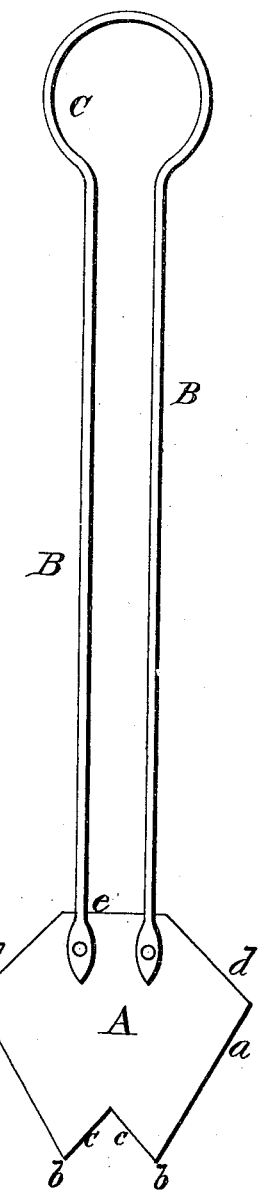

UNITED STATES PATENT OFFICE.

PETER TRIMMER, OF MULBERRY, PENNSYLVANIA.

IMPROVEMENT IN HAY-KNIVES.

Specification forming part of Letters Patent No. 174,875, dated March 14, 1876; application filed December 14, 1875.

*To all whom it may concern:*

Be it known that I, PETER TRIMMER, of Mulberry, in the county of York and State of Pennsylvania, have invented certain new and useful Improvements in Hay-Knives; and do hereby declare that the following is a full, clear, and exact description thereof, reference being had to the accompanying drawings, and to the letters of reference marked thereon, making a part of this specification.

My invention consists in the construction of a knife used for cutting hay from a stack, as hereinafter more fully set forth.

In the annexed drawings, forming a part of this specification, is shown a view of the knife and its handle.

A represents a metallic blade, formed as represented in the drawings, with its sides inclined outward a short distance from the top E, as seen at $d\ d$, and thence inclined inward to points $b\ b$.

The points $b\ b$ are formed by the inward inclined sides $a\ a$, and by cutting out a semi-diamond-shaped piece at the bottom between the two sides $a$. The edges $a\ a$ and $c\ c$ are sharpened to form cutting-edges.

Attached to the blade is a handle formed of a single metallic rod, B, bent over into a loop, C, and with the two ends extended down and riveted to the blade.

By experiments I have found that a hay-knife thus constructed is cheaply made, and that the form of knife shown and described will cut smoothly, easily, and with but little friction.

Having thus fully described my invention, what I claim is—

The blade A, having the long inclined cutting-edges $a\ a$ and bottom inclines $c\ c$, which form points $b\ b$, and connected to the handle B C, substantially as set forth.

In testimony that I claim the foregoing I have hereunto set my hand this 29th day of November, 1875.

PETER TRIMMER.

Witnesses:
EMANUEL GOCHENOUER,
LATIMER H. DIERDORFF.